O. HOEL.
BOX FOR CONTAINING EXPOSED AND UNEXPOSED PHOTOGRAPH PLATES.
APPLICATION FILED JAN. 25, 1916.
1,191,597.
Patented July 18, 1916.
2 SHEETS—SHEET 1.
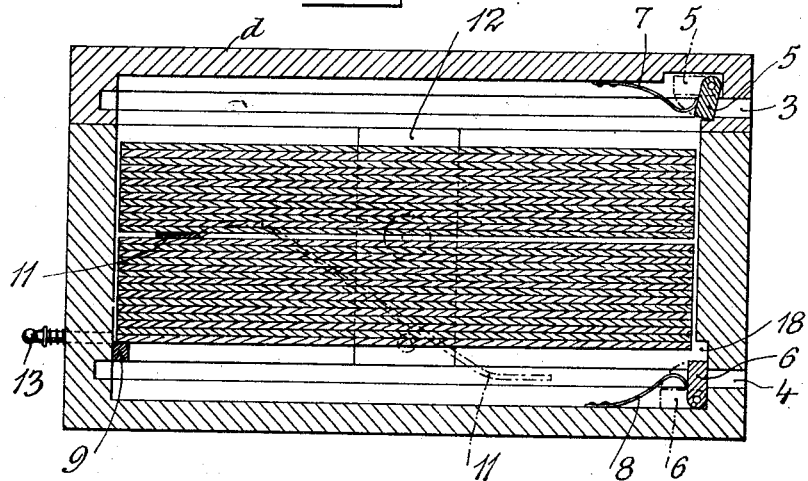
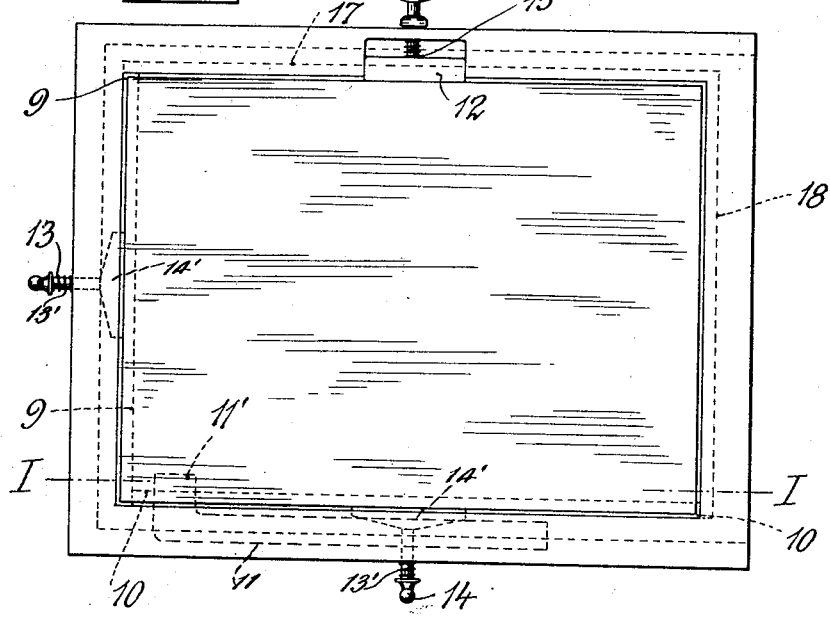
Inventor
Ola Hoel.
by
Attorney O. HOEL.
BOX FOR CONTAINING EXPOSED AND UNEXPOSED PHOTOGRAPH PLATES.
APPLICATION FILED JAN. 25, 1916.
1,191,597. Patented July 18, 1916.
2 SHEETS—SHEET 2.
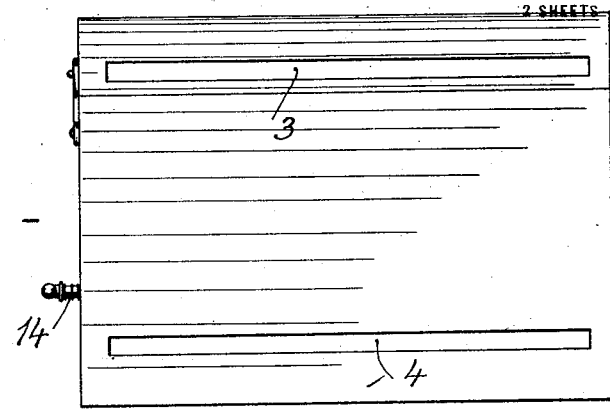
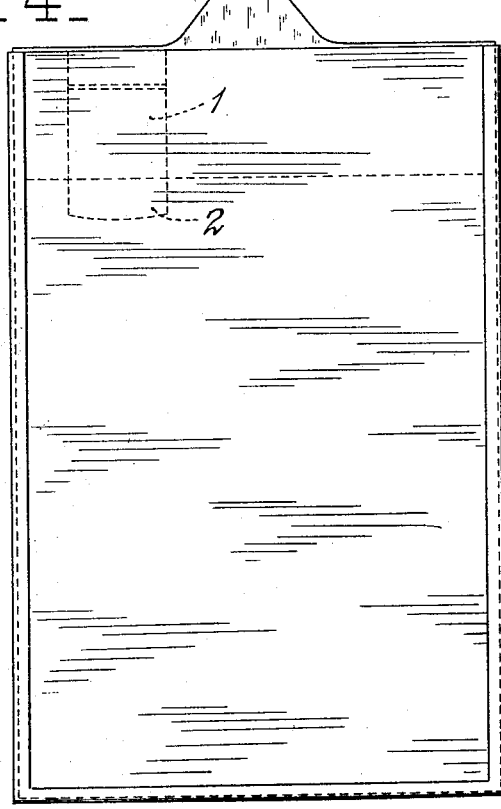
Inventor
Ola Hoel.
by
Attorney

UNITED STATES PATENT OFFICE.

OLA HOEL, OF RENNEBU, NORWAY.

BOX FOR CONTAINING EXPOSED AND UNEXPOSED PHOTOGRAPH-PLATES.

1,191,597.  Specification of Letters Patent.  Patented July 18, 1916.

Application filed January 25, 1916. Serial No. 74,102.

*To all whom it may concern:*

Be it known that I, OLA HOEL, carver, citizen of Norway, residing at Rennebu, Norway, have invented new and useful Improvements in Boxes for Containing Exposed and Unexposed Photograph-Plates, of which the following is a specification.

The present invention has for its object to provide a box for containing or keeping exposed and unexposed photograph plates, and the distinguishing feature resides essentially in this that at the bottom as well as at the top of the light-tightly closed box an aperture is arranged corresponding in size to the cross section of the dark-slide or plate-holder and being normally light-tightly closed by an inner flap, which is spring-pressed in such a manner that it is pushed aside by introducing the holder into the box through the one or the other aperture thereby permitting the holder to receive an unexposed plate or to discharge an exposed plate. It thereby will be possible in full daylight to thansfer unexposed plates from the box into the holder and also to transfer exposed plates from the holder into the box.

The invention is illustrated in the accompanying drawings, in which:

Figure 1 is a longitudinal section through the plate box along the line I—I in Fig. 2. Fig. 2 is a plan view of the box, the cover being removed. Fig. 3 is a side or end view of the box. Fig. 4 is a side view of the plate holder, and Fig. 5 is a corresponding longitudinal section.

The dark-slide or plate-holder *a* is of the ordinary type constituting a metallic envelop *b* having space for receiving one plate. One of its walls *c* forms a sliding lid or shutter. The holder has a movable member —1— (Figs. 4 and 5) provided with a projection 2, which when the member is pushed down projects over the plate edge and holds the plate fast within the holder even if the shutter is pulled out.

The box (Figs. 1–3) has a cover *d* with ordinary hinges and with a locking device. The cover engages the box in a light-tight manner, so that the light cannot pass into the box. The box has two slots or apertures —3— and —4— through which the plate holder can be pushed into the box. The apertures are closed at their inner side by means of pivoted flaps —5— and 6—6 (Fig. 1). The latter are pressed by springs —7— and —8— against the edges of the apertures and prevent the light from passing into the box. When the plate holder is pushed in through one of the apertures —3, 4— the flap in question is turned to a position as indicated by dotted lines in Fig. 1 so as to allow the holder to pass.

Directly above the lowermost aperture —4— frames or supporting lists —9— and —10— (Figs. 1, 3) are arranged inwardly along the walls of the box. Unexposed photographic plates with their emulsion sides upward are placed in the box so as to be supported by these lists. A spring —11— is attached at one end to one side wall of the box and its free end has a lateral lug 11' which projects in between the underlying unexposed plates and the overlying exposed plates as indicated in Fig. —1— whereby the spring presses the unexposed plates constantly downward. In the wall located opposite the list —10— a movable pressing member —12— is arranged which by a spring —15— is pressed in against the pack of plates so as to hold the same in place assisted by the spring —11— and to protect them from being disturbed by vibrations. The member —12— may be pulled back by the handle —16— so as to release the plates.

At the middle part of the two walls carrying the lists —9— and —10— two pins —13— and —14— having push-member 14' at the inner end are arranged in level with the lowermost plate resting upon the lists —9— and —10—. By means of helical springs 13' the pins are held in the outermost position shown in the drawing, but they may be pushed into the box and serve to slide the lowermost plate beyond the lists —9— and —10—. Grooves —17— and —18— for this movement of the plate are made in the opposite walls of the box.

When an unexposed plate has to be transferred from the box to the holder, the latter is slid in through the aperture —4—, the shutter turning upward. The shutter is pulled out so far that the space for the plate is opened. The pins —13— and —14— are simultaneously pushed in, whereby the lowermost plate is slid beyond the lists and falls down into the holder. The latter is closed and is then pulled out it being now ready for use. The pressing member —12— is pulled out from the pack of plates, whereby the spring —11— presses down the pack, so that the latter is again resting upon the lists —9— and —10—.

When an exposed plate has to be transplaced from the holder into the box, the holder is slid in through the aperture —4— the shutter turning downward. The plate is clamped fast by the member —1—. The shutter of the plate holder is pulled out so far that the plate becomes free. The member —1— in the plate-holder and the member —12— in the box are pulled out simultaneously, whereby the plate falls from the holder into the box.

Having now described my invention, what I claim as new and desire to secure by Letters Patent is:

1. In a magazine for exposed and unexposed photographic plates, the combination of a box having a lid and adapted for the insertion of a dark slide in the top and in the bottom thereof; plate supporting means at the lower part of said box; and means for pushing the lowermost plate off of the supporting means.

2. In a magazine for exposed and unexposed photographic plates, the combination of a box having a lid and adapted for the insertion of a dark slide in the top and in the bottom thereof; plate supporting means at the lower part of said box; means for pushing the lowermost plate off of the supporting means; and means for preventing the lateral movement of the next to the lowermost plate.

3. In a magazine for exposed and unexposed photographic plates, the combination of a box having a closed bottom and provided at the bottom part of its side walls with deep horizontal interior grooves in three side walls, a horizontal opening in the fourth side wall and a shallow groove in two adjacent side walls just above the level of the deep grooves; supporting means secured to the side walls opposite said shallow grooves; and means for pushing the lowermost plate off of a supporting means.

4. In a magazine for exposed and unexposed photographic plates, the combination of a box having a closed bottom and provided at the bottom part of its side walls with deep horizontal interior grooves in three side walls, a horizontal opening in the fourth side wall and a shallow groove in two adjacent side walls just above the level of the deep grooves; horizontal lists secured to the side walls opposite to said shallow grooves; and means for pushing the lowermost plate off of the lists.

5. In a magazine for exposed and unexposed photographic plates, the combination of a box having a closed bottom and provided at the bottom part of its side walls with deep horizontal interior grooves in three side walls, a horizontal opening in the fourth side wall and a shallow groove in two adjacent side walls just above the level of the deep grooves; horizontal lists secured to the side walls opposite to said shallow grooves; and outwardly spring-pressed pins passing through two of the side walls and provided on their inner ends with pushers disposed above the middle part of said lists and having the vertical thickness of a photographic plate.

6. In a magazine for exposed and unexposed photographic plates, the combination of a box having a closed bottom and provided at the bottom part of its side walls with deep horizontal interior grooves in three side walls, a horizontal opening in the fourth side wall and a shallow groove in two adjacent side walls just above the level of the deep grooves; supporting means secured to the side walls opposite said shallow grooves; means for pushing the lowermost plate off of the supporting means; and a steadying means engaging one side of all of the plates.

7. In a magazine for exposed and unexposed photographic plates, the combination of a box having a closed bottom and provided at the bottom part of its side walls with deep horizontal interior grooves in three side walls, a horizontal opening in the fourth side wall and a shallow groove in two adjacent side walls just above the level of the deep grooves; horizontal lists secured to the side walls opposite to said shallow grooves; outwardly spring-pressed pins passing through two of the side walls and provided on their inner ends with pushers disposed above the middle part of said lists and having the vertical thickness of a photographic plate; and an inwardly spring-pressed vertical pressing member movably mounted in one of said side walls opposite one of said pins, and provided with a handle extending through the wall of the box.

8. In a magazine for exposed and unexposed photographic plates, the combination of a box having a closed bottom and provided at the bottom part of its side walls with deep horizontal interior grooves in three side walls, a horizontal opening in the fourth side wall and a shallow groove in two adjacent side walls just above the level of the deep grooves; horizontal lists secured to the side walls opposite to said shallow grooves; outwardly spring-pressed pins passing through two of the side walls and provided on their inner ends with pushers disposed above the middle part of said lists and having the vertical thickness of a photographic plate; a cover hinged to the top of the box and having side walls provided with horizontal interior grooves and an end opening; and safety flaps for yieldably closing said openings.

9. In a magazine for exposed and unexposed photographic plates, the combination of a box having a closed bottom and provided at the bottom part of its side walls with deep horizontal interior grooves in three side walls, a horizontal opening in the fourth side wall and a shallow groove in two adjacent side walls just above the level of the deep grooves; horizontal lists secured to the side walls opposite to said shallow grooves; outwardly spring-pressed pins passing through two of the side walls and provided on their inner ends with pushers disposed above the middle part of said lists and having the vertical thickness of a photographic plate; a cover hinged to the top of the box and having side walls provided with horizontal interior grooves and an end opening; and dark slides adapted to be moved into said interior grooves and end openings.

10. In a magazine for exposed and unexposed photographic plates, the combination of a box having a closed bottom and provided at the bottom part of its side walls with deep horizontal interior grooves in three sides walls, a horizontal opening in the fourth side wall and a shallow groove in two adjacent side walls just above the level of the deep grooves; horizontal lists secured to the side walls opposite to said shallow grooves; outwardly spring-pressed pins passing through two of the side walls and provided on their inner ends with pushers disposed above the middle part of said lists and having the vertical thickness of a photographic plate; an inwardly spring-pressed vertical pressing member movably mounted in one of said pins, and provided with a handle extending through the wall of the box; a cover hinged to the top of the box and having side walls provided with horizontal interior grooves and an end opening; safety flaps for yieldably closing said opening; a spring attached at one end to one side wall of the box and provided at its free end with a lateral lug adapted to project between an underlying unexposed plate and an overlying exposed plate and dark slides adapted to be moved into said interior grooves and end openings.

11. In a magazine for exposed and unexposed photographic plates, the combination of a box adapted for the insertion of a dark slide in the top and in the bottom thereof; means for at will dropping plates from the bottom part of the box into the dark slide; and means for holding the plates in the upper part of the box separate from those in the lower part and yieldably pressing the plates in the lower part toward the bottom.

12. In a magazine for exposed and unexposed photographic plates, the combination of a box adapted for the insertion of a dark slide in the top and in the bottom thereof; means for at will dropping plates from the bottom part of the box into the dark slide; and a spring attached at one end to one side wall of the box and provided at its free end with a lateral lug adapted to protect between an underlying unexposed plate and an overlying exposed plate.

In testimony whereof I have signed my name to this specification in the presence of two subscribing witnesses.

OLA HOEL.

Witnesses:
LEIL M. BOC,
E. T. HOEL.

Copies of this patent may be obtained for five cents each, by addressing the "Commissioner of Patents, Washington, D. C."